(12) United States Patent
Lin et al.

(10) Patent No.: US 11,321,870 B2
(45) Date of Patent: May 3, 2022

(54) CAMERA ATTITUDE TRACKING METHOD AND APPARATUS, DEVICE, AND SYSTEM

(71) Applicant: TENCENT TECHNOLOGY (SHENZHEN) COMPANY LIMITED, Shenzhen (CN)

(72) Inventors: Xiangkai Lin, Shenzhen (CN); Yonggen Ling, Shenzhen (CN); Linchao Bao, Shenzhen (CN); Xiaolong Zhu, Shenzhen (CN); Liang Qiao, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/001,658

(22) Filed: Aug. 24, 2020

(65) Prior Publication Data

US 2020/0388051 A1 Dec. 10, 2020

Related U.S. Application Data

(63) Continuation of application No. PCT/CN2019/083437, filed on Apr. 19, 2019.

(30) Foreign Application Priority Data

May 22, 2018 (CN) .......................... 201810495056.7

(51) Int. Cl.
  *G06T 7/73* (2017.01)
  *G06T 3/00* (2006.01)
  *G06T 19/00* (2011.01)
(52) U.S. Cl.
  CPC .............. *G06T 7/74* (2017.01); *G06T 3/0006* (2013.01); *G06T 19/006* (2013.01)

(58) Field of Classification Search
  None
  See application file for complete search history.

(56) References Cited

U.S. PATENT DOCUMENTS 9,524,555 B2 * 12/2016 Zhang ........................ G06T 7/75
10,515,458 B1 * 12/2019 Yakimenko ............. G06T 17/05
(Continued)

FOREIGN PATENT DOCUMENTS

| CN | 103971400 A | 8/2014 |
|---|---|---|
| CN | 107194968 A | 9/2017 |

(Continued)

OTHER PUBLICATIONS

The World Intellectual Property Organization (WIPO) International Search Report for PCT/CN2019/083437 dated Jul. 29, 2019 5 Pages (including translation).

(Continued)

*Primary Examiner* — Steven Z Elbinger
(74) *Attorney, Agent, or Firm* — Anova Law Group, PLLC

(57) ABSTRACT

Embodiments of this application disclose a camera attitude tracking method and apparatus, a device, and a system in the field of augmented reality (AR). The method includes receiving, by a second device with a camera, an initial image and an initial attitude parameter that are transmitted by a first device; obtaining, by the second device, a second image acquired by the camera; obtaining, by the second device, a camera attitude variation of the second image relative to the initial image; and obtaining, by the second device, according to the initial attitude parameter and the camera attitude variation, a second camera attitude parameter, the second camera attitude parameter corresponding to the second image.

20 Claims, 9 Drawing Sheets

(56) References Cited

U.S. PATENT DOCUMENTS

| | | | | |
|---|---|---|---|---|
| 2012/0300979 | A1* | 11/2012 | Pirchheim | G06T 7/246 |
| | | | | 382/103 |
| 2013/0148851 | A1* | 6/2013 | Leung | G06K 9/3241 |
| | | | | 382/103 |
| 2014/0217178 | A1 | 8/2014 | Zhou et al. | |
| 2016/0232657 | A1* | 8/2016 | Wang | G06T 7/70 |
| 2017/0323458 | A1 | 11/2017 | Lablans | |
| 2018/0075660 | A1 | 3/2018 | Jouet et al. | |
| 2018/0286065 | A1* | 10/2018 | Knorr | G06T 7/277 |
| 2018/0293805 | A1* | 10/2018 | Wang | G06T 7/73 |
| 2020/0012858 | A1 | 1/2020 | Xiang | |

FOREIGN PATENT DOCUMENTS

| | | |
|---|---|---|
| CN | 107590453 A | 1/2018 |
| CN | 107833237 A | 3/2018 |
| CN | 108537845 A | 9/2018 |
| CN | 108596976 A | 9/2018 |
| CN | 108615247 A | 10/2018 |
| CN | 108615248 A | 10/2018 |
| CN | 108648235 A | 10/2018 |
| CN | 108682036 A | 10/2018 |
| CN | 108682037 A | 10/2018 |
| CN | 108682038 A | 10/2018 |
| CN | 108734736 A | 11/2018 |
| CN | 108876854 A | 11/2018 |

OTHER PUBLICATIONS

The European Patent Office (EPO) Office action 1 for 19808400.6 dated Mar. 18, 2022 5 Pages.

* cited by examiner

CAMERA ATTITUDE TRACKING METHOD AND APPARATUS, DEVICE, AND SYSTEM

RELATED APPLICATIONS

This application claims priority to PCT Application No. PCT/CN2019/083437, filed on Apr. 19, 2019, which claims priority of Chinese Patent Application No. 201810495056.7, entitled "CAMERA ATTITUDE TRACKING METHOD AND APPARATUS, DEVICE, AND STORAGE MEDIUM" filed with the China National Intellectual Property Administration on May 22, 2018. The two applications incorporated herein by reference in their entirety.

FIELD OF THE TECHNOLOGY

This application relates to the field of augmented reality (AR), and in particular, to a camera attitude tracking method and apparatus, a device, and a storage medium.

BACKGROUND OF THE DISCLOSURE

In the field of AR, a device carrying a camera needs to track a motion attitude of the camera in a real environment during a motion process without prior information of the environment. In a camera attitude tracking process, the device establishes a three-dimensional coordinate system for the real environment.

In one example, the device uses the first image initially acquired as an anchor image, performs feature point tracking on a subsequent image relative to the anchor image, calculates a homography matrix between the subsequent image and the anchor image according to a feature point tracking result, and decomposes the homography matrix, to obtain, according to a decomposition result, a camera attitude when the camera acquires the subsequent image.

In a multiplayer mode with coordination of a plurality of devices in an AR application, because hardware parameters and camera photographing angles of the devices are different, three-dimensional coordinate systems established by the devices for the real environment are different, which results in that camera attitudes tracked by the devices are different. If two devices are required to perform camera attitude tracking based on the same reference, an environment map (including a large quantity of image frames and three-dimensional points) constructed on a first device needs to be synchronized to that of a second device. A large amount of data needs to be transmitted in a synchronization process, which goes against implementation on an electronic device using a mobile network.

SUMMARY

According to embodiments of this application, a camera attitude tracking method and apparatus, a device, and a storage medium are provided.

One aspect of this application provides a camera attitude tracking method, applied to a second device with a camera. The method includes receiving, by a second device with a camera, an initial image and an initial attitude parameter that are transmitted by a first device; obtaining, by the second device, a second image acquired by the camera; obtaining, by the second device, a camera attitude variation of the second image relative to the initial image; and obtaining, by the second device, according to the initial attitude parameter and the camera attitude variation, a second camera attitude parameter, the second camera attitude parameter corresponding to the second image.

Another aspect of this application provides a camera attitude tracking electronic device. The electronic device includes a memory and a processor, the memory storing computer-readable instructions, the computer-readable instructions, when executed by the processor, causing the processor to perform the following operations: receiving, by a second device with a camera, an initial image and an initial attitude parameter that are transmitted by a first device; obtaining, by the second device, a second image acquired by the camera; obtaining, by the second device, a camera attitude variation of the second image relative to the initial image; obtaining, by the second device, according to the initial attitude parameter and the camera attitude variation, a second camera attitude parameter, the second camera attitude parameter corresponding to the second image; and displaying, by the second device, an AR scene according to the second camera attitude parameter, the AR scene of the second device being consistent with an AR scene displayed on the first device corresponding to the initial image.

Another aspect of this application provides a computer-readable storage medium, storing computer-readable instructions, the computer-readable instructions, when executed by one or more processors, causing the one or more processors to perform the following operations: receiving, by a second device with a camera, an initial image and an initial attitude parameter that are transmitted by a first device; obtaining, by the second device, a second image acquired by the camera; obtaining, by the second device, a camera attitude variation of the second image relative to the initial image; obtaining, by the second device, according to the initial attitude parameter and the camera attitude variation, a second camera attitude parameter, the second camera attitude parameter corresponding to the second image; and displaying, by the second device, an AR scene according to the second camera attitude parameter, the AR scene of the second device being consistent with an AR scene displayed on the first device corresponding to the initial image.

Details of one or more embodiments of this application are provided in the following accompany drawings and descriptions. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application. All other embodiments obtained by a person of ordinary skill in the art based on the embodiments of this application without creative efforts shall fall within the scope of this application.

First, several terms involved in this application are introduced.

AR is a technology of calculating a camera attitude parameter of a camera in the real world (which may also be referred to as a three-dimensional world) in real time in a process of acquiring an image by the camera, and adding a virtual element to the image acquired by the camera according to the camera attitude parameter. The virtual element includes, but is not limited to: an image, a video, and three-dimensional models. The AR technology aims to connect a virtual world to the real world on a screen for interaction. The camera attitude parameter includes a rotation matrix and a displacement vector. The rotation matrix is used for representing a rotation angle of the camera in the real world. The displacement vector is used for representing a displacement of the camera in the real world.

Figure 1:
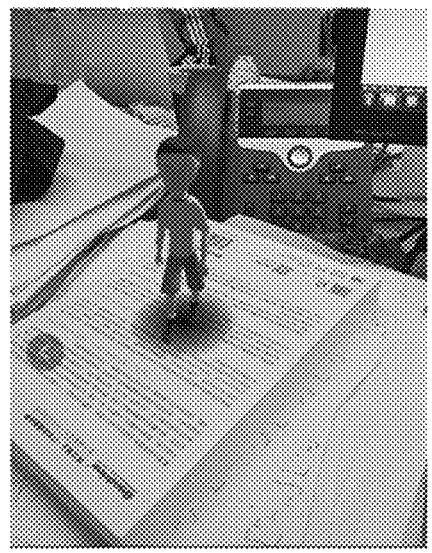
FIG. 1 is a schematic scenario diagram of an AR application scenario according to an exemplary embodiment of this application.
Figure 2:
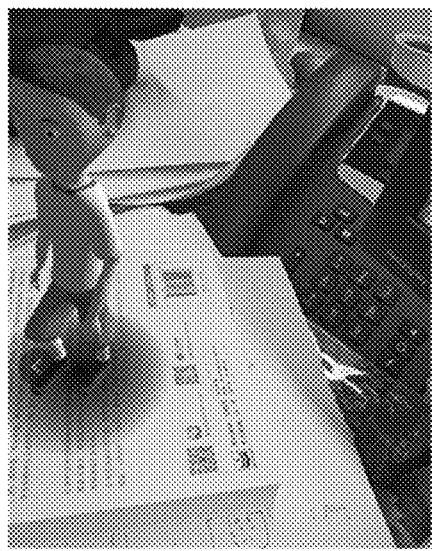
FIG. 2 is a schematic scenario diagram of an AR application scenario according to an exemplary embodiment of this application.

For example, referring to FIG. 1 and FIG. 2, a device adds a virtual character to an image photographed by a camera. With motion of the camera in the real world, the image photographed by the camera changes, and a photographing orientation of the virtual character also changes, so as to simulate an effect that the virtual character stays still in the image while the camera photographs the image and the virtual character simultaneously with a changing position and attitude, to present a realistic three-dimensional picture to a user.

An anchor-switching AR system is an AR system that determines a camera attitude parameter in a natural scene based on camera attitude tracking connecting a plurality of anchor images, to superimpose a virtual world on an image acquired by a camera according to the camera attitude parameter.

An inertial measurement unit (IMU) is an apparatus configured to measure a three-axis attitude angle (or an angular rate) and acceleration of an object. Generally, one IMU includes three single-axis accelerometers and three single-axis gyroscopes. The accelerometer is configured to detect an acceleration signal of an object on each coordinate axis in a three-dimensional coordinate system, to obtain a displacement vector (errors may be accumulated along with time) through calculation. The gyroscope is configured to detect a rotation matrix of the object in the three-dimensional coordinate system. In some embodiments, the IMU includes a gyroscope, an accelerometer, and a geomagnetic sensor.

Exemplarily, the three-dimensional coordinate system is established as follows: 1. An X axis is defined using a vector product Y*Z, and at a current position of the device on the X-axis, points to the east along a direction tangent to ground. 2. A Y axis at the current position of the device points to the north pole of a geomagnetic field along a direction tangent to the ground. 3. A Z axis points to the sky and is perpendicular to the ground.

Relocation is a technology of re-performing the tracking process if feature point tracking on a target image relative to an $i^{th}$ anchor image fails in a camera attitude tracking process based on the $i^{th}$ anchor image and the camera attitude tracking process cannot be successfully performed. Relocation includes tracking feature point tracking on the target image relative to another image (an initial image or another representative image of a key frame), so that when the feature point tracking succeeds, a camera attitude used by the camera to acquire a current image is determined according to the re-performed tracking process. An initial image may also be referred to as a born-image, or a first marker image.

Figure 3:
FIG. 3 is a structural block diagram of an AR system according to an exemplary embodiment of this application.

FIG. 3 is a structural block diagram of an AR system according to an exemplary embodiment of this application. The AR system includes a first device 120 and a second device 140.

The first device 120 is an electronic device such as a smartphone, a tablet computer, a moving picture experts group audio layer III (MP3 player or a moving picture experts group audio layer IV (MP4) player with an intelligent operating system installed, or a portable mobile terminal. A target AR program is run in the first device 120. The target AR program may be an AR program coordinately used by a plurality of persons. A program type of the target AR program includes, but is not limited to, at least one of an AR teaching program, an AR gaming program, an AR translation program, an AR social program, an AR sport program, and an AR driving assistance program.

The first device 120 is connected to the second device 140 through a data line, a wired network, Bluetooth, or a wireless fidelity (WiFi) network. That is, data communication may be directly performed between the first device 120 and the second device 140.

The second device 140 is an electronic device such as a smartphone, a tablet computer, an MP3 player or an MP4 player with an intelligent operating system installed, or a portable mobile terminal. A target AR program is also installed in the second device 140.

In some embodiments, the target AR programs installed in the first device 120 and the second device 140 may be the same, or may be different. In some embodiments, there is no differentiation between the first device 120 and the second device 140. In some other embodiments, the first device 120 is a main device, and the second device 140 is a slave device.

A person skilled in the art may further see that, a quantity of devices in the AR system may be more than two. When there are a plurality of devices, the first device 120 and the second device 140 may be any two of the plurality of devices. This is not limited in this application.

Figure 4:
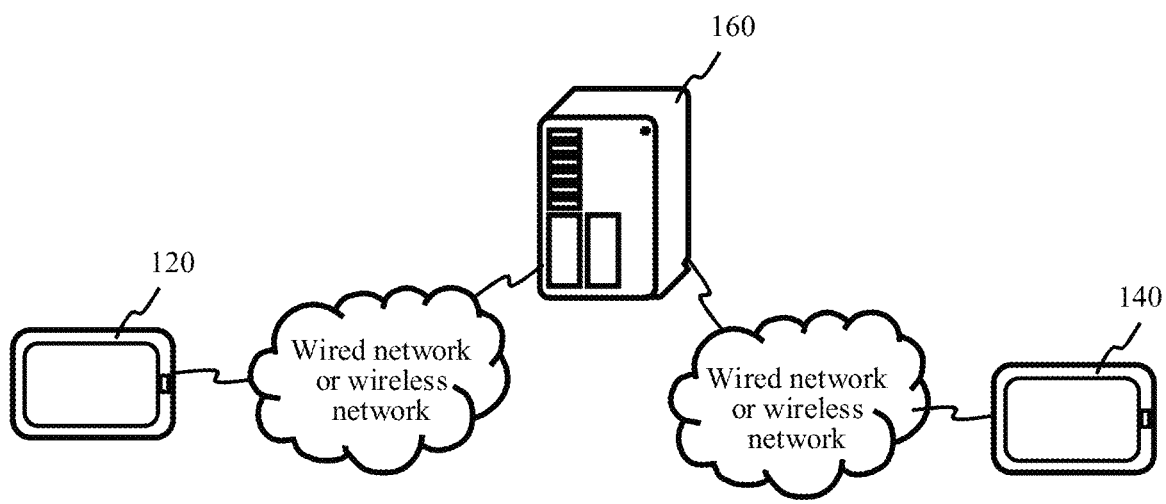
FIG. 4 is a structural block diagram of an AR system according to another exemplary embodiment of this application.

FIG. 4 is a structural block diagram of an AR system according to another exemplary embodiment of this application. The AR system includes: a first device 120, a server 160, and a second device 140.

Different from FIG. 1, the AR system in this embodiment further includes the server 160.

The first device 120 is connected to the server 160 through a network. The network may be a wireless network or a wired network. A target AR program is installed and run in the first device 120.

The second device 140 is connected to the server 160 through a network. The network may be a wireless network or a wired network. A target AR program is also installed and run in the second device 120.

The server 160 may be one server, a server cluster including a plurality of servers, a cloud computing center, a virtual computing center, or a distributed computing center. The server 160 may be configured to provide a backend service for the target AR program.

In some embodiments, the first device 120 and the second device 140 are "guests" of the server. In some other embodiments, a distributed computing policy is used between the server and the first device 120 and the second device 140 for coordinated computing. This is not limited in this embodiment.

Figure 5:
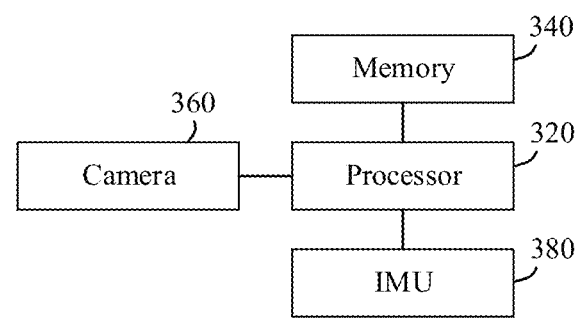
FIG. 5 is a structural block diagram of an electronic device according to another exemplary embodiment of this application.

FIG. 5 is a structural block diagram of an electronic device according to an exemplary embodiment of this application. The electronic device may be the first device 120 and/or the second device 140. The electronic device includes: a processor 320, a memory 340, a camera 360, and an IMU 380.

The processor 320 includes one or more processing cores, which may be, for example, a 4-core processor or an 8-core processor. The processor 320 is configured to execute at least one of an instruction, code, a code snippet, and a program stored in the memory 340.

The processor 320 is electrically connected to the memory 340. In some embodiments, the processor 320 is connected to the memory 340 by using a bus. The memory 340 stores one or more instructions, code, code snippets, and/or programs. The instruction, the code, the code snippet, and/or the program are/is executed by the processor 320 to implement a camera attitude tracking method provided in the following embodiments.

The processor 320 is further electrically connected to the camera 360. In some embodiments, the processor 320 is connected to the camera 360 by using a bus. The camera 360 is a sensing device having an image acquisition capability. The camera 360 may also be referred to as another name such as a camera component or a sensing device. The camera 360 has a capability of continuously acquiring images or acquiring images a plurality of times. In some embodiments, the camera 360 is disposed inside the electronic device or outside the device.

In some embodiments, the processor 320 is further electrically connected to IMU 380. The IMU 380 is configured to collect a attitude vector of the camera at a pre-determined time interval, and record a timestamp of each set of attitude parameters during collection. The attitude parameters of the camera include a displacement vector and a rotation matrix. The rotation matrix collected by the IMU 380 is relatively accurate. The collected displacement vector may have a relatively large error caused by an actual environment.

In some embodiments, a specific form of the electronic device may be a smartphone, a tablet computer, AR glasses, an AR helmet, a portable notebook computer, an e-book reader, an MP3, an MP4, a handheld console, or the like. This is not limited in this embodiment of this application.

Figure 6:
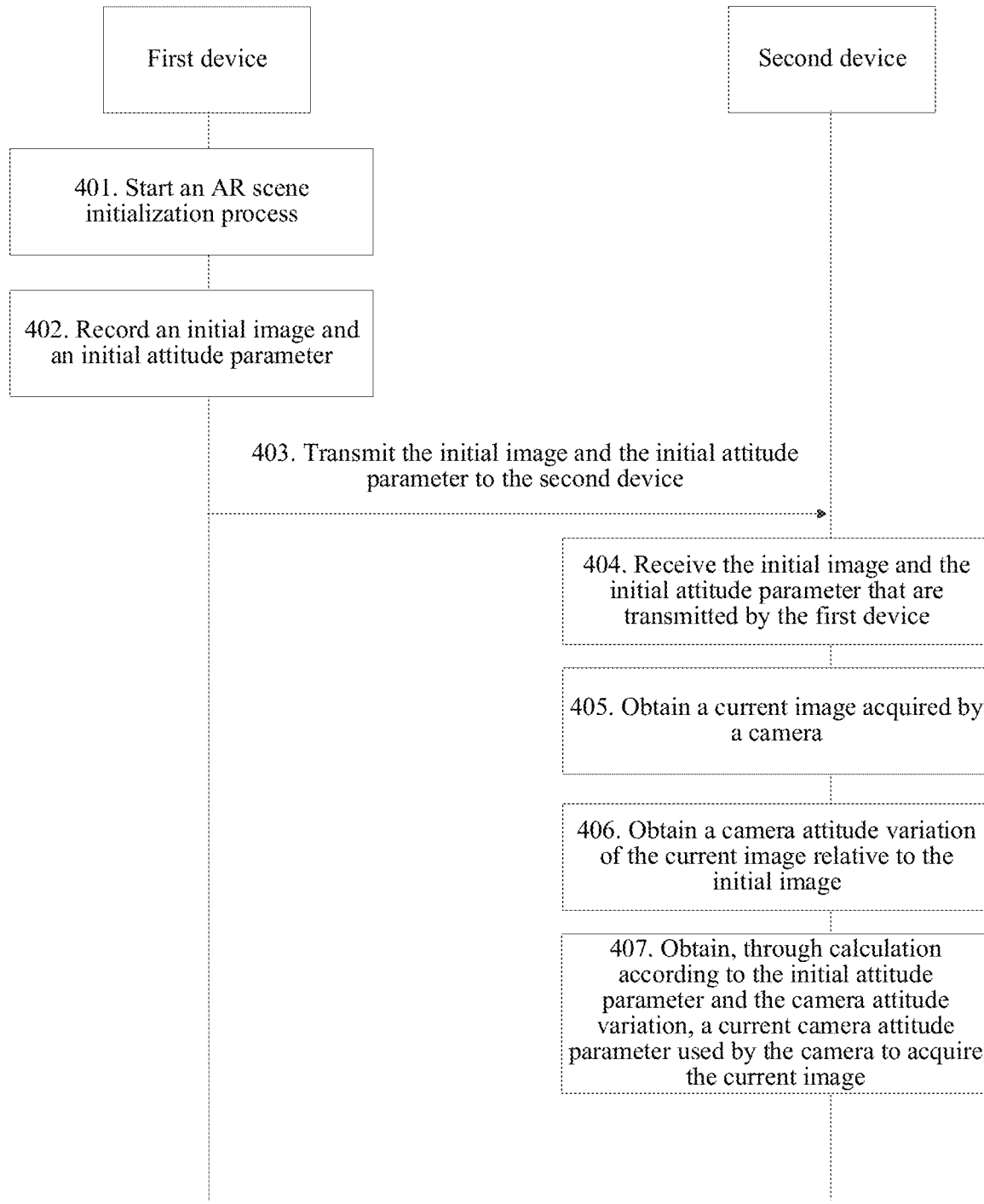
FIG. 6 is a flowchart of a camera attitude tracking method according to an exemplary embodiment of this application.

FIG. 6 is a flowchart of a camera attitude tracking method according to an exemplary embodiment of this application. The method may be applied to the AR system shown in FIG. 1 or shown in FIG. 2. The method includes the following steps:

Step 401. The first device starts an AR scene initialization process.

A target AR program supporting a multiplayer mode is run in the first device and the second device.

After the target AR program is started, for example, an AR scene or a round of an AR game is started, the first device performs an AR scene initialization process. In some embodiments, the initialization process includes as follows:

1. The first device acquires frames of images in a real environment by using a built-in camera.

A first camera is disposed in the first device. After the target AR program is started, the first camera continuously acquires frames of images in the real environment, and then transmits the images to a processor for processing.

2. The first device uses the first frame of image (or an image specified by a user) as a initial image.

The first device uses the first frame of image as the initial image. Alternatively, the first device uses the image specified by the user as the initial image.

3. The first device receives an initial attitude parameter specified by the user.

In some embodiments, the initial attitude parameter is set by the user, or is set by the user by using the target AR program. A setting process of the initial attitude parameter may be explicitly perceived by the user, or may be explicitly unperceived by the user.

For example, the target AR program is a gaming program that superimposes virtual dolls in the real world. When the user controls the target AR program to superimposes one virtual doll in an image acquired by the camera, the image during superimposing the virtual doll is set as the initial image, and the attitude parameter during superimposing the virtual doll is set as the initial attitude parameter. However, the setting process is unperceived by the user.

4. The first device performs a camera attitude tracking process according to the initial image and the initial attitude parameter.

The first device performs a camera attitude tracking process according to the initial image and the initial attitude parameter. A camera attitude tracking technology the same as or similar to that a stand-alone form may be used in the camera attitude tracking process.

Step 402. The first device records an initial image and an initial attitude parameter.

Step 403. The first device transmits the initial image and the initial attitude parameter to the second device.

In some embodiments, the first device and the second device have the same target AR program installed. Alternatively, same target AR programs are installed in the first device and the second device, and a preset condition is met between the two target AR programs. For example, the two target AR programs are logged in to by using respective accounts. The preset condition includes, but is not limited to, at least one of two user accounts being friends, two user accounts being in the same AR scene, two user accounts being in the same AR mode, and two user accounts being in the same AR game room.

In some embodiments, a target data channel is directly established between the first device and the second device. The first device transmits the initial image and the initial attitude parameter to the second device through the target data channel. The target data channel includes at least one of WiFi, Bluetooth, a wired network, and a data line.

In some other embodiments, data between the first device and the second device needs to be forwarded through the server. The first device first transmits the initial image and the initial attitude parameter to the server, and the server forwards the initial image and the initial attitude parameter to the second device.

Step 404. The second device receives the initial image and the initial attitude parameter that are transmitted by the first device.

The second device receives the initial image and the initial attitude parameter that are transmitted by the first device through the target data channel or the server.

The initial image is the first anchor image of the first device in the camera attitude tracking process. The initial attitude parameter is a camera attitude parameter corresponding to the first anchor image. Both the initial image and the initial attitude parameter are data generated by the first device, rather than data generated by the second device.

Step 405. The second device obtains a current image acquired by a camera.

A second camera is disposed in the second device. After the target AR program is started, the second camera continuously acquires frames of images in the real environment, and then transmits the images to a processor for processing.

Step 406. The second device obtains a camera attitude variation of the current image relative to the initial image.

The second device performs camera attitude tracking on the current image acquired by the second device relative to the initial image transmitted by the first device, and obtains, through calculation, the camera attitude variation of the current image relative to the initial image.

The camera of the second device does not acquire the initial image. This step is performing camera attitude tracking by assuming the initial image to be an image acquired by the second device. In a typical AR scene, the first device and the second device photograph the same real scene, for example, the same desktop. Therefore, images photographed by the first device and the second device are certainly correlated, and the initial image acquired by the first device may be assumed to be an image acquired by the second device for use.

Step 407. The second device obtains, through calculation according to the initial attitude parameter and the camera attitude variation, a current camera attitude parameter used by the camera to acquire the current image.

In some embodiments, the second device obtains, through calculation according to the following formula, the camera attitude parameter including R and T used by the second camera to acquire the current image:

$$\begin{bmatrix} R & T \\ 0 & 1 \end{bmatrix} = \begin{bmatrix} R_{cf} & T_{cf} \\ 0 & 1 \end{bmatrix} * \begin{bmatrix} R_{initial} & T_{initial} \\ 0 & 1 \end{bmatrix},$$

$R_{cf}$ being a rotation matrix in the camera attitude variation, $T_{cf}$ being a displacement vector in the camera attitude variation, $R_{initial}$ being a rotation matrix in the initial attitude parameter, and $T_{initial}$ being a displacement vector in the initial attitude parameter.

Based on the foregoing, according to the camera attitude tracking method provided in this embodiment, the second device receives the initial image and the initial attitude parameter that are transmitted by the first device, calculates the camera attitude variation of the current image acquired by the camera of the second device relative to the initial image, and obtains, through calculation according to the initial attitude parameter and the camera attitude variation, the camera attitude parameter used by the camera to acquire the current image. In this way, the second device performs camera attitude tracking on the image acquired by the second device relative to the initial image of the first device, that is, the first device and the second device use the same initial image and initial attitude parameter to perform camera attitude tracking, which ensures that camera attitude tracking results of the first device and the second device are the same, thereby resolving a problem that a large amount of data needs to be transmitted if an environment map constructed on the first device needs to be synchronized to the second device.

Because only one initial image and one initial attitude parameter need to be transmitted between the first device and the second device, a very small amount of data needs to be exchanged between the two devices. This is applicable to real-time synchronization in an AR scene between a plurality of mobile terminals, and does not occupy excess network communication bandwidth.

In the foregoing embodiment, the steps performed by the first device may be separately implemented as a camera attitude tracking method on a first device side, and the steps performed by the second device may be separately implemented as a camera attitude tracking method on a second device side.

Figure 7:
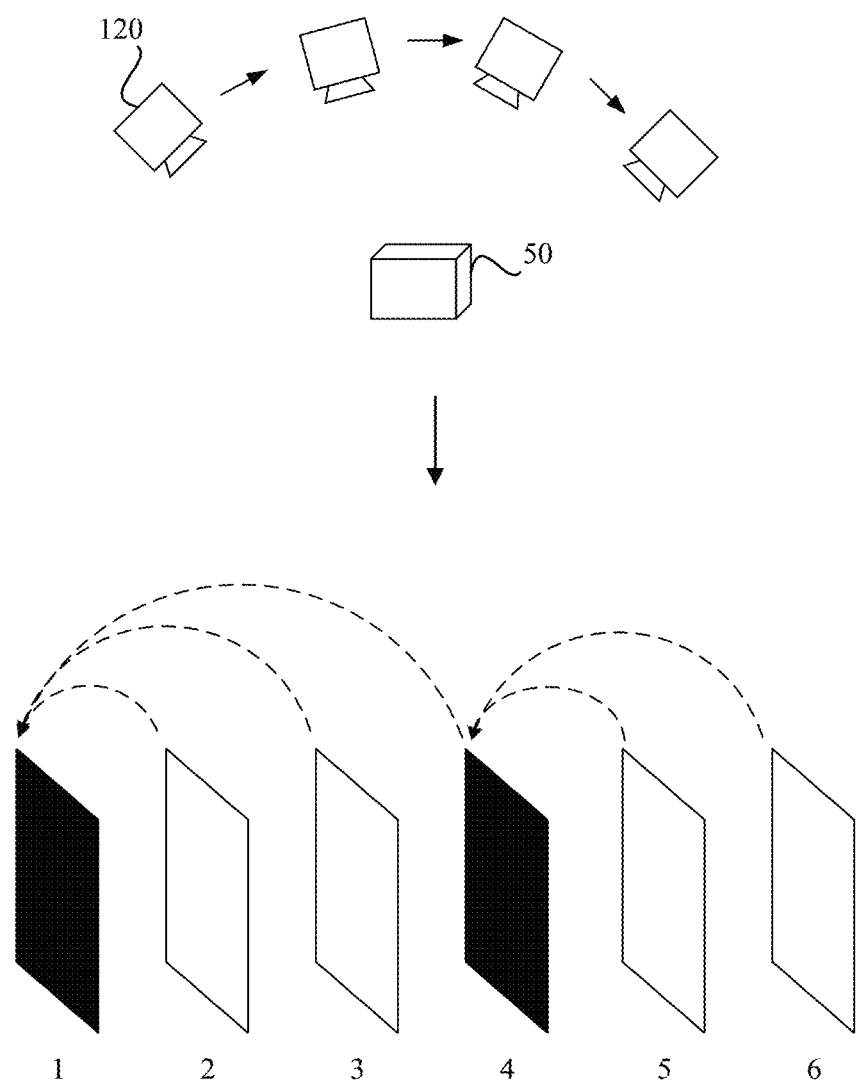
FIG. 7 is a schematic diagram of a principle of an anchor-switching AR system algorithm according to an exemplary embodiment of this application.

In one embodiment based on FIG. 6, the first device uses an anchor-switching AR system algorithm to perform camera attitude tracking. According to the anchor-switching AR system algorithm, in a process of determining a camera attitude, an entire motion process of the first camera is divided into at least two tracking processes for tracking, and each tracking process corresponds to a respective anchor image. Specifically, camera attitude tracking is first performed on a current image photographed by the camera based on the initial image (also referred to as the first anchor image). A camera attitude tracking process may include as follows: In a tracking process corresponding to an $i^{th}$ anchor image, when a tracking effect of the current image relative to the $i^{th}$ anchor image is worse than a preset condition (for example, a quantity of feature points that can be matched is less than a preset threshold), a previous image of the current image is determined as an $(i+1)^{th}$ anchor image, to start an $(i+1)^{th}$ tracking process, i being a positive integer. Exemplarily, referring to FIG. 7, in the real world, there is an object 50. The first device 120 provided with the first camera is held by the user and moves, and a plurality of frames of images 1 to 6 including the object 50 are obtained through photographing during movement. The device determines the image 1 as an initial image (or an initial anchor) and records a initial attitude parameter. The initial attitude parameter may be an initial attitude parameter set by the user, or a attitude parameter used by the camera to acquire the image 1 and acquired by the IMU. Then, feature point tracking is performed on the image 2 relative to the image 1, and a attitude parameter used by the camera to photograph the image 2 is calculated according to the initial attitude parameter and a feature point tracking result. Feature point tracking is performed on the image 3 relative to the image 1, and a attitude parameter used by the camera to photograph the image 3 is calculated according to the initial attitude parameter and a feature point tracking result. Feature point tracking is performed on the image 4 relative to the image 1, and a attitude parameter used by the camera to photograph the image 4 is calculated according to the initial attitude parameter and a feature point tracking result.

Then, feature point tracking is performed on the image 5 relative to the image 1. If a feature point tracking effect is worse than a preset condition (for example, a quantity of matched feature points is relatively small), the image 4 is determined as the second anchor image. Feature point tracking is performed on the image 5 relative to the image 4, a displacement variation of the camera between the image 4 and the image 5 during photographing is calculated, and then a attitude parameter used by the camera to photograph the image 5 is calculated with reference to the displacement variation of the camera between the image 4 and the image 1 during photographing and the initial attitude parameter. Then, feature point tracking is performed on the image 6 relative to the image 4. The rest can be done in the same manner. If a feature point tracking effect of a current image is poor, a previous frame of image of the current image may be determined as a new anchor image, and feature point tracking is re-performed based on the new anchor image.

In some embodiments, the feature point tracking may use an algorithm based on a visual odometer principle, for example, a feature point method or a direct method.

In one embodiment based on FIG. 6, after receiving the initial image and the initial attitude parameter, the second device performs camera attitude tracking on a current image acquired by the second camera in the second device relative to the initial image. Assuming that the current image has different image acquisition timing and/or image content, this step may be implemented using at least one of the following two implementations.

First, the second device relocates/repositions/re-orients the current image relative to the initial image, to obtain a camera attitude variation.

Second, the second device obtains a first attitude variation of an $i^{th}$ anchor image relative to the initial image, i>1, performs feature point tracking on the current image relative to the $i^{th}$ anchor image, to obtain a second attitude variation, and obtains the camera attitude variation through calculation according to the first attitude variation and the second attitude variation.

Figure 8:
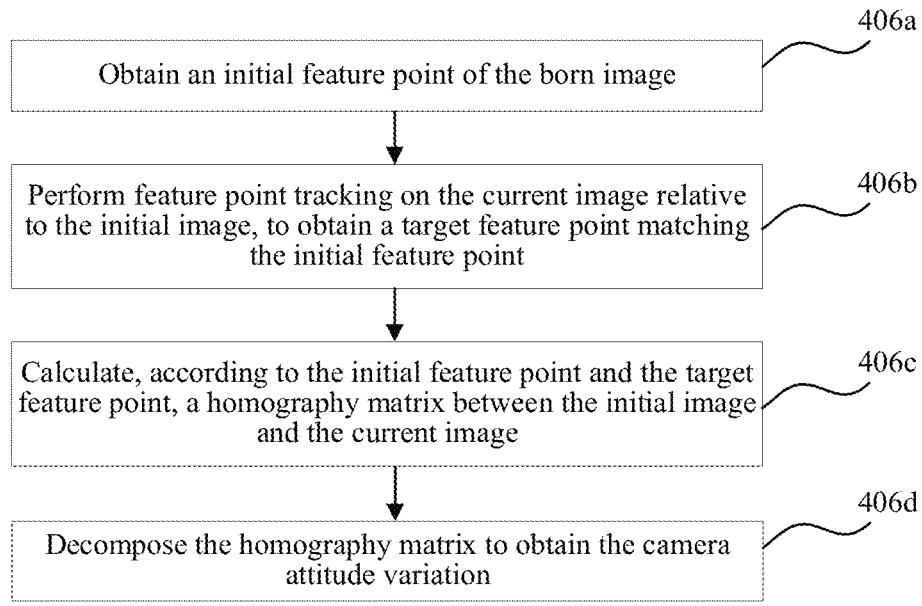
FIG. 8 is a flowchart of a camera attitude tracking method according to another exemplary embodiment of this application.
Figure 9:
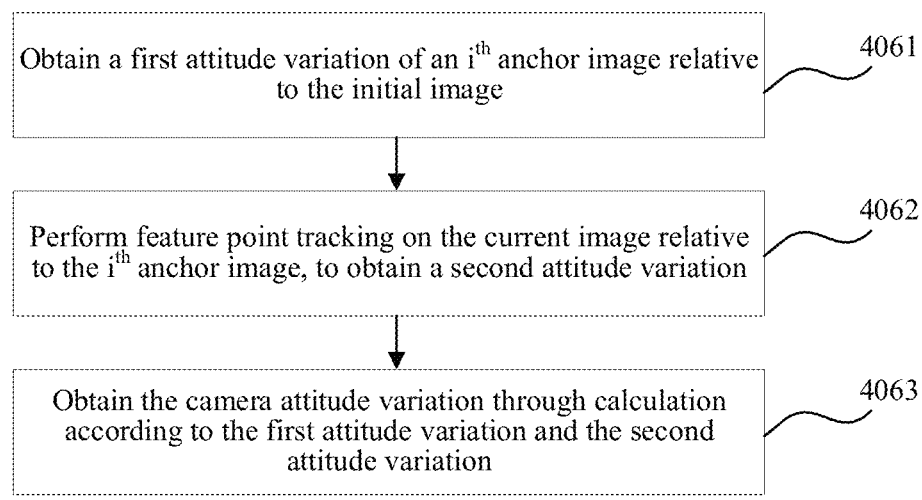
FIG. 9 is a flowchart of a camera attitude tracking method according to another exemplary embodiment of this application.

The following describes the first implementation with reference FIG. 8, and describes the second implementation with reference FIG. 9.

In one embodiment based on FIG. 6, the second device uses the first implementation to obtain a camera attitude variation of a current image relative to the initial image. When the current image is one of the first few frames of images acquired by the second camera in the second device (or a loss occurs in a camera attitude tracking process), because the first anchor image is not specified yet by the second device, the second device sets the received initial image as the first anchor image of the second device, and the second device relocates/repositions/re-orients the current image relative to the initial image, to obtain the camera attitude variation. In some embodiments, if the current image is successfully relocated/repositioned/re-oriented, repositioned, or re-oriented relative to the initial image, the current image is switched (or set) to/as the second anchor image, and feature point tracking is performed on an image acquired after the current image relative to the second anchor image. Step 406 includes, but is not limited to, the following steps:

Step 406*a*: The second device obtains an initial feature point of the initial image.

In some embodiments, when the first device transmits the initial image to the second device, and also transmits the initial feature point on the initial image, the second device directly reads the initial feature point of the initial image. The initial feature point is a feature point extracted from the initial image, and there may be a plurality of initial feature points, for example, 10 to 500 initial feature points.

In some embodiments, if the first device does not transmit the initial feature point on the initial image to the second device, the second device extracts the initial feature point on the initial image. In some embodiments, the first device may extract the feature point by using a feature extraction algorithm such as a features from accelerated segment test (FAST) detection algorithm, a Shi-Tomasi corner detection algorithm, a Harris corner detection algorithm, a scale-invariant feature transform (SIFT) algorithm, or an oriented FAST and rotated binary robust independent elementary feature (BRIEF) (ORB) algorithm.

Because real-time calculation of SIFT features is relatively difficult, to ensure real-time performance, the device may extract an ORB feature point on the first anchor image. One ORB feature point includes two parts: a FAST corner (a key point) and a BRIEF descriptor. Because the ORB feature has a relatively fast calculation speed, the ORB feature is suitable for being implemented on a mobile device.

The FAST corner refers to a position at which the ORB feature point is in an image. The FAST corner mainly detects a position at which a local pixel gray scale changes obviously, which is characterized by a high speed. The idea of the FAST corner is as follows: If a pixel differs greatly from (is excessively brighter or excessively darker than) an adjacent pixel, the pixel may be a corner.

The BRIEF descriptor is a binary vector, which describes information about pixels around the key point in an artificial design manner. A description vector of the BRIEF descriptor includes a plurality of 0 and 1, and 0 and 1 herein encode a size relationship between two pixels near the FAST corner.

Step 406*b*. The second device performs feature point tracking on the current image relative to the initial image, to obtain a target feature point matching the initial feature point.

The feature point tracking may use a tracking algorithm based on a visual odometer. This is not limited in this application. In an embodiment, the feature point tracking uses Kanade-Lucas (KLT) optical flow tracking algorithm. In another embodiment, the feature point tracking uses an ORB feature descriptor extracted based on the ORB algorithm. A specific algorithm for the feature point tracking is not limited in this application, and a feature point method or a direct method may be used in a feature point tracking process.

In an embodiment, the second device performs feature point extraction on the current image to obtain M candidate feature points, and then matches the M candidate feature points with N initial feature points one by one, to determine at least one matched feature point pair. Each matched feature point pair includes one initial feature point and one target feature point. The initial feature point is a feature point on the initial image, and the target feature point is a candidate feature point on the current image that matches the initial feature point at a highest degree.

In some embodiments, a quantity of initial feature points are greater than or equal to a quantity of target feature points. For example, the quantity of initial feature points is 450, and there are 320 target feature points.

Step 406c. The second device calculates, according to the initial feature point and the target feature point, a homography matrix between the initial image and the current image.

The homography matrix describes a mapping relationship between two imaging planes of the camera, that is, a mapping relationship between an imaging plane of the initial image and an imaging plane of the current image. If all feature points in a natural scene (a real environment) photographed on the two images fall on the same physical plane, the camera attitude motion estimation may be performed by using the homography matrix.

Step 406d. The second device decomposes the homography matrix to obtain the camera attitude variation.

When there are at least four pairs of matched initial feature points and target feature points, the device decomposes the homography matrix through ransac, to obtain the camera attitude variation. In some embodiments, the camera attitude variation includes a rotation matrix $R_{cf}$ and a translation vector $T_{cf}$.

In some embodiments, if the current image is successfully relocated, repositioned, or re-oriented, the second device may switch (or set) the current image to/as the second anchor image, and perform camera attitude tracking on other images acquired subsequently by the second camera relative to the second anchor image. For a related principle, reference may be made to FIG. 5.

Based on the foregoing, according to the camera attitude tracking method provided in this embodiment, the second device relocates/repositions/re-orients the current image relative to the initial image, to obtain the camera attitude variation through calculation. In this way, when the anchor image does not exist or is lost, various information in a camera attitude tracking process can be constructed according to the current image acquired by the second device and the initial image acquired by the first device, and camera attitude tracking is performed using the same reference as the first device, thereby implementing synchronization of camera attitude tracking processes of an AR scene in a multiplayer mode.

In one embodiment based on FIG. 6, the second device uses the second implementation to obtain a camera attitude variation of a current image relative to the initial image. If the current image is an image acquired by the second device after a camera attitude tracking process is performed for a period of time, the second device has performed camera attitude tracking according to the anchor-switching AR system algorithm for the period of time. In this case, a camera attitude tracking process based on an $i^{th}$ anchor image is performed, i being an integer greater than 1. As shown in FIG. 9, step 406 includes, but is not limited to, the following steps:

Step 4061. The second device obtains a first attitude variation of the $i^{th}$ anchor image relative to the initial image, i>1.

In some embodiments, the $i^{th}$ anchor image is the second anchor image, the third anchor image, the fourth anchor image, or the like. That is, the $i^{th}$ anchor image is an anchor image after the initial image.

The $i^{th}$ anchor image is an image successfully tracked in a historical process. The first attitude variation of the $i^{th}$ anchor image relative to the initial image is buffered in the second device. The first attitude variation includes a first rotation matrix $R_{mf}$ and a first displacement vector $T_{mf}$.

Step 4062. The second device performs feature point tracking on the current image relative to the $i^{th}$ anchor image, to obtain a second attitude variation.

The feature point tracking may use a tracking algorithm based on a visual odometer. This is not limited in this application. In an embodiment, the feature point tracking uses a KLT optical flow tracking algorithm. In another embodiment, the feature point tracking uses an ORB feature descriptor extracted based on the ORB algorithm. A specific algorithm for the feature point tracking is not limited in this application, and a feature point method or a direct method may be used in a feature point tracking process.

In an embodiment, this step includes the following substeps:

1. The second device performs feature point tracking on the current image relative to a reference feature point of the $i^{th}$ anchor image, to obtain a target feature point matching the reference feature point.

When setting the $i^{th}$ anchor image, the second device extracts N reference feature points of the $i^{th}$ anchor image. When performing feature point tracking on the current image relative to the reference feature points of the $i^{th}$ anchor image, the second device performs feature point extraction on the current image, to obtain M candidate feature points, and then matches the M candidate feature points with the N reference feature points one by one, to determine at least one matched feature point pair. Each matched feature point pair includes one reference feature point and one target feature point. The reference feature point is a feature point on the $i^{th}$ anchor image, and the target feature point is a candidate feature point on the current image that matches the reference feature point at a highest degree.

In some embodiments, a quantity of reference feature points is greater than or equal to a quantity of target feature points. For example, the quantity of reference feature points is 500, and there are 430 target feature points.

2. The second device calculates, according to the reference feature point and the target feature point, a homography matrix between the $i^{th}$ anchor image and the current image.

The homography matrix describes a mapping relationship between two imaging planes of the camera, that is, a mapping relationship between an imaging plane of the initial image and an imaging plane of the current image. If all feature points in a natural scene (a real environment) photographed on the two images fall on the same physical plane, camera attitude motion estimation may be performed by using the homography matrix.

3. The second device decomposes the homography matrix to obtain a second attitude variation.

When there are at least four pairs of matched reference feature points and target feature points, the device decomposes the homography matrix through ransac, to obtain the second attitude variation. In some embodiments, the second attitude variation includes a rotation matrix $R_{cm}$ and a translation vector $T_{cm}$.

Step 4063. The second device obtains the camera attitude variation through calculation according to the first attitude variation and the second attitude variation.

The second device obtains the camera attitude variation including $R_{cf}$ and $T_{cf}$ through calculation according to the following formula:

$$\begin{bmatrix} R_{cf} & T_{cf} \\ 0 & 1 \end{bmatrix} = \begin{bmatrix} R_{cm} & S_{mf} * T_{cm} \\ 0 & 1 \end{bmatrix} * \begin{bmatrix} R_{mf} & T_{mf} \\ 0 & 1 \end{bmatrix},$$

$S_{mf}$ being a scale of the $i^{th}$ anchor image.

In some embodiments, $S_{mf}$ is a preset value, or $S_{mf}$ is a projected feature point obtained by mapping an initial feature point on the initial image to the $i^{th}$ anchor image, and the scale corresponding to the $i^{th}$ image is obtained through calculation according to an average depth of projected feature points.

Based on the foregoing, according to the camera attitude tracking method provided in this embodiment, after performing feature point tracking on the current image relative to the $i^{th}$ anchor image, the second device obtains the camera attitude variation through calculation using the first attitude variation and the second attitude variation, and obtains the current camera attitude parameter through calculation according to the camera attitude variation and the initial attitude parameter. In this way, when the second device has performed camera attitude tracking for a period of time, various information in a camera attitude tracking process can be constructed according to the current image acquired by the second device and the initial image acquired by the first device, and camera attitude tracking is performed using the same reference as the first device, thereby implementing synchronization of camera attitude tracking processes of an AR scene in a multiplayer mode.

In one embodiment based on FIG. 9, a process of mapping, by the second device, an initial feature point on the first anchor image to the $i^{th}$ anchor image to obtain a projected feature point, and obtaining, through calculation, a scale corresponding to the $i^{th}$ anchor image according to an average depth of projected feature points is as follows:

1. The second device obtains a two-dimensional coordinate of the initial feature points on the initial image.

The second device pre-extracts and buffers the two-dimensional coordinate of the initial feature points on the initial image. The two-dimensional coordinate is represented in a homogeneous manner.

2. The second device performs back projection on the two-dimensional coordinate of the initial feature points, to obtain a first three-dimensional coordinate $X_{initial}$ of the initial feature points in a three-dimensional space.

The second device transforms the two-dimensional coordinate of the initial feature points to the three-dimensional space according to the following formula, to obtain the first three-dimensional coordinate $X_{initial}$ of the initial feature point in the three-dimensional space:

$$Xinitial_{=d*}\begin{bmatrix} \frac{1}{f_x} & 0 & -\frac{c_x}{f_x} \\ 0 & \frac{1}{f_y} & -\frac{c_y}{f_y} \\ 0 & 0 & 1 \end{bmatrix} * x_{initial},$$

$f_x$, $f_y$, $c_x$, and $c_y$ being built-in parameters of the camera, the two-dimensional coordinate $x_{born}$ of the initial feature point being a homogeneous representation on the first anchor image, the three-dimensional coordinate $X_{born}$ being a non-homogeneous representation, and an initial depth d of the first anchor image being assumed to be 1.

3. The second device performs three-dimensional rotation and translation on the first three-dimensional coordinate $X_{initial}$ by using the following formula, to obtain a second three-dimensional coordinate $X_{current}$ corresponding to the initial feature points on the $i^{th}$ anchor image:

$$X_{current} = R*X_{initial} + T,$$

$R_{mf}$ being the rotation matrix in the first attitude variation, and $T_{mf}$ being the displacement vector in the first attitude variation.

4. The second device projects the second three-dimensional coordinate $X_{current}$ to the $i^{th}$ anchor image, to obtain a two-dimensional coordinate of a projected feature point on the $i^{th}$ anchor image.

The second three-dimensional coordinate $X_{current}$ is projected to the $i^{th}$ anchor image by using the following formula, to obtain the two-dimensional coordinate $x_{current}$ of the projected feature point on the $i^{th}$ anchor image:

$$x_{current} = \begin{bmatrix} fx & 0 & cx \\ 0 & fy & cy \\ 0 & 0 & 1 \end{bmatrix} * X_{current},$$

$f_x$, $f_y$, $c_x$, and $c_y$ being built-in parameters of the second camera.

5. The second device obtains the scale $s_{mf}$ of the $i^{th}$ anchor image through calculation according to an average depth of projected feature points on the $i^{th}$ anchor image.

Because both the first device and the second device assume that a depth of the three-dimensional point corresponding to the initial image is 1, and use the same initial attitude parameter, three-dimensional worlds established by the first device and the second device with respect to the real world are definitely the same. Therefore, alignment of three-dimensional coordinate systems is directly implemented between the two devices.

The camera attitude tracking method provided in this embodiment of this application can be applied to the field of AR, to track a motion attitude of a camera in a real environment during a motion process without prior information of the environment. Typical application scenarios are as follows:

Multiplayer Online Battle Arena AR Game:

A plurality of devices are connected to the same game or game room. A first user uses any one of the devices to perform an initialization process to obtain an initial image and an initial attitude parameter, and then synchronizes the initial image and the initial attitude parameter to another device used by a second user. The another device performs camera attitude tracking based on the initial image and the initial attitude parameter. The plurality of devices finally implement the real-time multiplayer AR game based on the same camera tracking reference.

AR-Based Treasure Hunting Game:

A first user buries a treasure (a virtual treasure) at a location A in the real world by using a first device. When passing through the location A in the real world, another user searches the location A for the treasure by using a second device, and may open and take away the treasure by using an AR program on the second device.

It is to be understood that the steps in the embodiments of this application are not necessarily performed in a sequence indicated by the step numbers. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

In an embodiment, an electronic device is further provided. The electronic device includes a camera attitude tracking apparatus. The camera attitude tracking apparatus includes modules, and each module may be all or partially implemented by software, hardware, or a combination thereof.

The following is an apparatus embodiment in this application. For technical details not described in the apparatus embodiment, reference may be made to the related description in the foregoing method embodiment. This is not limited in this application.

Figure 10:
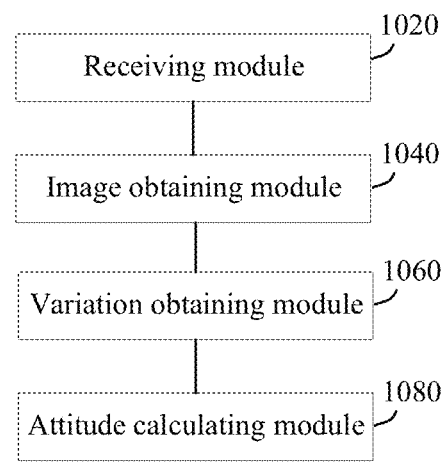
FIG. 10 is a block diagram of a camera attitude tracking apparatus according to an exemplary embodiment of this application.

FIG. 10 is a block diagram of a camera attitude tracking apparatus according to an exemplary embodiment of this application. The apparatus may be implemented as a part of an electronic device (a second device) or as the device by software, hardware, or a combination of the two. The apparatus includes: a receiving module 1020, configured to receive an initial image and an initial attitude parameter that are transmitted by a first device; an image obtaining module 1040, configured to obtain a current image acquired by a camera; a variation obtaining module 1060, configured to obtain a camera attitude variation of the current image relative to the initial image; and an attitude calculating module 1080, configured to obtain, through calculation according to the initial attitude parameter and the camera attitude variation, a current camera attitude parameter used by the camera to acquire the current image.

In one embodiment, the variation obtaining module 1060 is configured to relocate/reposition/re-orient the current image relative to the initial image, to obtain the camera attitude variation, and/or the variation obtaining module 1060 is configured to: obtain a first attitude variation of an $i^{th}$ anchor image relative to the initial image, i>1; perform feature point tracking on the current image relative to the $i^{th}$ anchor image, to obtain a second attitude variation; and obtain the camera attitude variation through calculation according to the first attitude variation and the second attitude variation.

In one embodiment, the variation obtaining module 1060 is configured to: obtain an initial feature point of the initial image; perform feature point tracking on the current image relative to the initial image, to obtain a target feature point matching the initial feature point; calculate, according to the initial feature point and the target feature point, a homography matrix between the initial image and the current image; and decompose the homography matrix to obtain the camera attitude variation.

In one embodiment, assuming that the first attitude variation includes a first rotation matrix $R_{mf}$ and a first displacement vector $T_{mf}$, and the second attitude variation includes a second rotation matrix $R_{cm}$ and a second displacement vector $T_{cm}$, the variation obtaining module 1060 is configured to obtain the camera attitude variation including $R_{cf}$ and $T_{cf}$ through calculation according to the following formula:

$$\begin{bmatrix} R_{cf} & T_{cf} \\ 0 & 1 \end{bmatrix} = \begin{bmatrix} R_{cm} & S_{mf} * T_{cm} \\ 0 & 1 \end{bmatrix} * \begin{bmatrix} R_{mf} & T_{mf} \\ 0 & 1 \end{bmatrix},$$

$S_{mf}$ being a scale of the $i^{th}$ anchor image.

In one embodiment, the attitude calculating module 1080 is configured to obtain the camera attitude parameter including R and T through calculation according to the following formula:

$$\begin{bmatrix} R & T \\ 0 & 1 \end{bmatrix} = \begin{bmatrix} R_{cf} & T_{cf} \\ 0 & 1 \end{bmatrix} * \begin{bmatrix} R_{initial} & T_{initial} \\ 0 & 1 \end{bmatrix},$$

$R_{cf}$ being a rotation matrix in the camera attitude variation, $T_{cf}$ being a displacement vector in the camera attitude variation, $R_{initial}$ being a rotation matrix in the initial attitude parameter, and $T_{initial}$ being a displacement vector in the initial attitude parameter.

In one embodiment, the receiving module 1020 is configured to receive the initial image and the initial attitude parameter that are transmitted by the first device through a target data channel, the target data channel including at least one of a WiFi network, Bluetooth, a wired network, and a data line; and/or the receiving module 1020 is configured to receive the initial image and the initial attitude parameter that are transmitted by a server, the initial image and the initial attitude parameter being transmitted to the server by the first device.

For camera attitude tracking performed by the camera attitude tracking apparatus provided in the foregoing embodiment, only division of the foregoing functional module is used as an example for description. During actual application, the foregoing functions may be allocated to and completed by different functional modules according to requirements, that is, the internal structure of the device is divided into different functional modules, to complete all or some of the foregoing described functions. In addition, the camera attitude tracking apparatus provided in the foregoing embodiments and the camera attitude tracking method embodiments fall within the same conception. For a specific implementation process of the camera attitude tracking apparatus, refer to the method embodiments.

Figure 11:
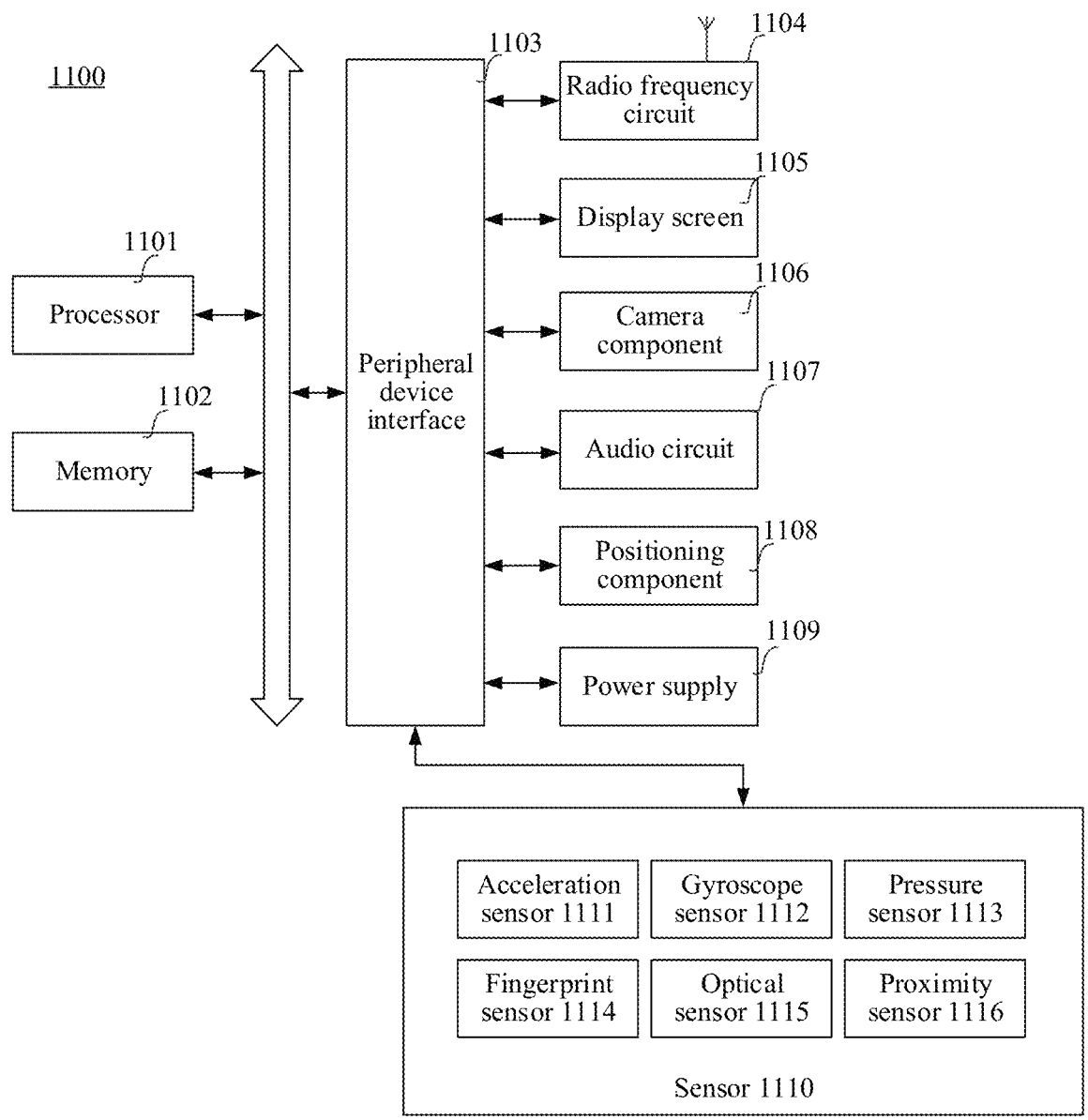
FIG. 11 is a block diagram of an electronic device according to an exemplary embodiment of this application.

FIG. 11 is a structural block diagram of a terminal 1100 according to an exemplary embodiment of this application. The terminal 1100 may be a smartphone, a tablet computer, an MP3 player, an MP4 player, a notebook computer, or a desktop computer. The terminal 1100 may also be referred to as other names such as a user device, a portable terminal, a laptop computer, or a desktop terminal.

Generally, the terminal 1100 includes a processor 1101 and a memory 1102.

The processor 1101 may include one or more processing cores, which may be, for example, a 4-core processor or an 8-core processor. The processor 1101 may be implemented in at least one hardware form of a digital signal processor (DSP), a field programmable gate array (FPGA), and a programmable logic array (PLA). The processor 1101 may also include a main processor and a coprocessor. The main processor is a processor configured to process data in an active state, which is also referred to as a central processing unit (CPU). The coprocessor is a low power consumption processor configured to process data in a standby state. In some embodiments, the processor 1101 may be integrated with a graphics processing unit (GPU). The GPU is configured to be responsible for rendering and drawing content that a display screen needs to display. In some embodiments, the processor 1101 may further include an artificial intelligence (AI) processor. The AI processor is configured to process a computing operation related to machine learning.

The memory 1102 may include one or more computer-readable storage media. The computer-readable storage medium may be non-transient. The memory 1102 may further include a high-speed random access memory (RAM) and a nonvolatile memory, for example, one or more disk storage devices or flash memory devices. In some embodiments, the non-transitory computer-readable storage medium in the memory 1102 is configured to store at least one instruction. The at least one instruction is configured to be executed by the processor 1101 to implement the camera attitude tracking method provided in the method embodiment of this application.

In some embodiments, the terminal 1100 may In some embodiments further include: a peripheral device interface 1103 and at least one peripheral device. The processor 1101 and the memory 1102 may be connected to the peripheral device interface 1103 by using a bus or a signal line. The peripheral devices may be connected to the peripheral device interface 1103 by using a bus, a signal line, or a circuit board. Specifically, the peripheral device includes at least one of: a radio frequency (RF) circuit 1104, a display screen 1105, a camera component 1106, an audio circuit 1107, a positioning component 1108, and a power supply 1109.

The peripheral device interface 1103 may be configured to connect at least one input/output (I/O)-related peripheral device to the processor 1101 and the memory 1102. In some embodiments, the processor 1101, the memory 1102 and the peripheral device interface 1103 are integrated on the same chip or circuit board. In some other embodiments, any one or two of the processor 1101, the memory 1102, and the peripheral device interface 1103 may be implemented on a single chip or circuit board. This is not limited in this embodiment.

The RF circuit 1104 is configured to receive and transmit an RF signal, which is also referred to as an electromagnetic signal. The RF circuit 1104 communicates with a communications network and other communications devices by using the electromagnetic signal. The RF circuit 1104 may convert an electric signal into an electromagnetic signal for transmission, or convert a received electromagnetic signal into an electric signal. In some embodiments, the RF circuit 1104 includes an antenna system, an RF transceiver, one or more amplifiers, a tuner, an oscillator, a digital signal processor, a codec chip set, a subscriber identity module card, and the like. The RF circuit 1104 may communicate with other terminals through at least one wireless communication protocol. The wireless communication protocol includes, but is not limited to: a world wide web, a metropolitan area network, an intranet, (2G, 3G, 4G, and 5G) mobile communication networks, a wireless local area network, and/or a WiFi network. In some embodiments, the RF circuit 1104 may also include a circuit related to near field communication (NFC). This is not limited in this application.

The display screen 1105 is configured to display a user interface (UI). The UI may include a graph, a text, an icon, a video, and any combination thereof. When the display screen 1105 is a touchscreen, the display screen 1105 is further capable of collecting a touch signal on or over a surface of the display screen 1105. The touch signal may be inputted into the processor 1101 as a control signal for processing. In this case, the display screen 1105 may be further configured to provide a virtual button and/or a virtual keyboard, also referred to as a soft button and/or a soft keyboard. In some embodiments, there is one display screen 1105, disposed on a front panel of the terminal 1100. In some other embodiments, there may be two display screens 1105, respectively disposed on different surfaces of the terminal 1100 or designed in a foldable shape. In still some other embodiments, the display screen 1105 may be a flexible display screen, disposed on a curved surface or a folded surface of the terminal 1100. Even, the display screen 1105 may be further set to have a non-rectangular irregular graph, that is, a special-shaped screen. The display screen 1105 may be manufactured by using a material such as a liquid crystal display (LCD) or an organic light-emitting diode (OLED).

The camera component 1106 is configured to acquire an image or a video. In some embodiments, the camera component 1106 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1106 may further include a flash. The flash may be a single color temperature flash, or may be a double color temperature flash. The double color temperature flash refers to a combination of a warm flash and a cold flash, and may be used for light compensation at different color temperatures.

The audio circuit 1107 may include a microphone and a speaker. The microphone is configured to: collect sound waves of a user and an environment, and convert the sound waves into the electric signals to be inputted to the processor 1101 for processing, or to be inputted to the RF circuit 1104 for implementing speech communication. For the purpose of stereo sound collection or noise reduction, there may be a plurality of microphones, respectively disposed at different parts of the terminal 1100. The microphone may be further an array microphone or an omni-directional collection type microphone. The speaker is configured to convert the electric signals from the processor 1101 or the RF circuit 1104 into the sound waves. The speaker may be a conventional thin-film speaker, or may be a piezoelectric ceramic speaker. When the speaker is the piezoelectric ceramic speaker, the electric signals not only can be converted into the sound waves audible to a human being, but also can be converted into the sound waves inaudible to the human being for ranging and the like. In some embodiments, the audio circuit 1107 may further include an earphone jack.

The positioning component 1108 is configured to position a current geographic location of the terminal 1100, to implement a navigation or a location based service (LBS). The positioning component 1108 may be a positioning component based on the global positioning system (GPS) of the United States, the COMPASS System of China, or the Galileo system of Russia.

The power supply 1109 is configured to supply power for components in the terminal 1100. The power supply 1109 may be an alternating current, a direct current, a primary battery, or a rechargeable battery. When the power supply 1109 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 1100 further includes one or more sensors 1110. The one or more sensors 1110 include, but are not limited to, an acceleration sensor 1111, a gyroscope sensor 1112, a pressure sensor 1113, a fingerprint sensor 1114, an optical sensor 1115, and a proximity sensor 1111.

The acceleration sensor 1111 may detect acceleration on three coordinate axes of a coordinate system established by the terminal 1100. For example, the acceleration sensor 1111 may be configured to detect a component of gravity acceleration on the three coordinate axes. The processor 1101 may control, according to a gravity acceleration signal collected by the acceleration sensor 1111, the display screen 1105 to display the UI in a frame view or a longitudinal view. The acceleration sensor 1111 may be further configured to collect game or user motion data.

The gyroscope sensor 1112 may detect a body direction and a rotation angle of the terminal 1100. The gyroscope sensor 1112 may cooperate with the acceleration sensor 1111 to collect a 3D action by the user on the terminal 1100. The processor 1101 may implement the following functions according to the data collected by the gyroscope sensor 1112: motion sensing (such as changing the UI according to a tilt operation of the user), image stabilization at shooting, game control, and inertial navigation.

The pressure sensor 1113 may be disposed at a side frame of the terminal 1100 and/or a lower layer of the display screen 1105. When the pressure sensor 1113 is disposed on the side frame of the terminal 1100, a holding signal of the user to the terminal 1100 may be detected, and the processor 1101 performs left/right hand identification and a quick action according to the holding signal collected by the pressure sensor 1113. When the pressure sensor 1113 is disposed on the lower layer of the display screen 1105, the processor 1101 controls an operable control on the UI interface according to a pressure operation of the user on the display screen 1105. The operable control includes at least one of a button control, a scroll-bar control, an icon control, and a menu control.

The fingerprint sensor 1114 is configured to collect a user's fingerprint. The processor identifies a user's identity according to the fingerprint collected by the fingerprint sensor 1114, or identifies the user's identity according to the fingerprint collected by the fingerprint sensor 1114. When identifying that the user's identity is a trusted identity, the processor 1101 authorizes the user to perform related sensitive operations. The sensitive operations includes: unlocking a screen, viewing encryption information, downloading software, paying and changing a setting, and the like. The fingerprint sensor 1114 may be disposed on a front surface, a back surface, or a side surface of the terminal 1100. When a physical button or a vendor logo is disposed on the terminal 1100, the fingerprint sensor 1114 may be integrated with the physical button or the vendor logo.

The optical sensor 1115 is configured to collect ambient light intensity. In an embodiment, the processor 1101 may control the display brightness of the display screen 1105 according to the ambient light intensity collected by the optical sensor 1115. Specifically, when the ambient light intensity is relatively high, the display brightness of the display screen 1105 is turned up. When the ambient light intensity is relatively low, the display brightness of the display screen 1105 is turned down. In another embodiment, the processor 1101 may further dynamically adjust a camera parameter of the camera component 1106 according to the ambient light intensity collected by the optical sensor 1115.

The proximity sensor 1116, also referred to as a distance sensor, is generally disposed on the front panel of the terminal 1100. The proximity sensor 1116 is configured to collect a distance between the user and the front surface of the terminal 1100. In an embodiment, when the proximity sensor 1116 detects that the distance between the user and the front surface of the terminal 1100 gradually becomes small, the display screen 1105 is controlled by the processor 1101 to switch from a bright screen state to an on-screen state. When the proximity sensor 1116 detects that the distance between the user and the front surface of the terminal 1100 gradually becomes large, the display screen 1105 is controlled by the processor 1101 to switch from the on-screen state to the bright screen state.

A person skilled in the art may understand that a structure shown in FIG. 11 constitutes no limitation on the terminal 1100, and the terminal may include more or fewer components than those shown in the figure, or some components may be combined, or a different component deployment may be used.

Figure 12:
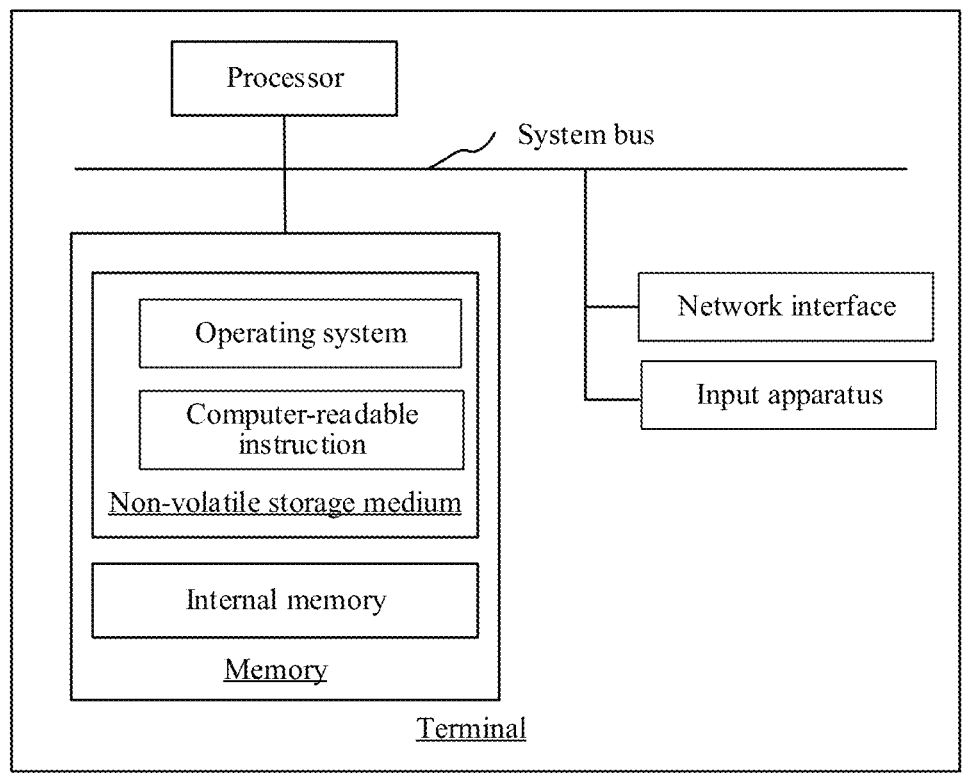
FIG. 12 is a diagram of an internal structure of an electronic device according to an embodiment.

FIG. 12 is a diagram of an internal structure of an electronic device according to an embodiment. As shown in FIG. 12, the electronic device includes a processor, a memory, a network interface, and an input apparatus that are connected by using a system bus. The memory includes a non-volatile storage medium and an internal memory. The non-volatile storage medium of the electronic device stores an operating system, and may further store computer-readable instructions, the computer-readable instructions, when executed by the processor, causing the processor to perform the camera attitude tracking method. The internal memory may also store computer-readable instructions, and the computer-readable instructions, when executed by the processor, causing the processor to perform the camera attitude tracking method. The input device may be a touch layer covering a display screen, or may be a button, a trackball, or a touch panel disposed on a housing of the electronic device, or may be an external keyboard, a touch panel, or a mouse.

A person skilled in the art may understand that, the structure shown in FIG. 12 is only a block diagram of a partial structure related to the solution of this application, and does not constitute a limitation to the electronic device to which the solution of this application is applied. Specifically, the electronic device may include more or fewer components than those shown in the figure, or some components may be combined, or a different component deployment may be used.

In an embodiment, the camera attitude tracking apparatus provided in this application may be implemented in a form of a computer-readable instruction, and the computer-readable instruction may run on the electronic device shown in FIG. 12. The memory of the electronic device may store program modules forming the camera attitude tracking apparatus, for example, the receiving module 1020, the image obtaining module 1040, the variation obtaining module 1060, and the attitude calculating module 1080 shown in FIG. 10. The computer-readable instruction formed by the program modules causes the processor to perform the steps in the camera attitude tracking method in the embodiments of this application described in this specification.

An embodiment of this application provides a computer-readable storage medium. The storage medium stores computer-readable instructions, the computer-readable instructions being loaded and executed by a processor to implement the camera attitude tracking method shown in FIG. 6.

The sequence numbers of the foregoing embodiments of this application are merely for description purposes, and are not intended to indicate priorities of the embodiments.

A person of ordinary skill in the art may understand that some or all procedures in the method in the foregoing embodiments may be implemented by a computer program instructing related hardware. The program may be stored in a non-volatile computer-readable storage medium, and when the program is executed, the procedures in the foregoing method embodiments may be implemented. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a RAM or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

What is claimed is:

1. A camera attitude tracking method, comprising:
   receiving, by a second device with a camera, an initial image and an initial attitude parameter that are transmitted by a first device;
   obtaining, by the second device, a second image acquired by the camera;
   obtaining, by the second device, a camera attitude variation of the second image relative to the initial image; and
   obtaining, by the second device, according to the initial attitude parameter and the camera attitude variation, a second camera attitude parameter corresponding to the second image, comprising:
      calculating a rotation matrix in the second camera attitude parameter and a displacement vector in the second camera attitude parameter according to: a rotation matrix in the camera attitude variation, a displacement vector in the camera attitude variation, a rotation matrix in the initial attitude parameter, and a displacement vector in the initial attitude parameter.

2. The method according to claim 1, wherein the obtaining, by the second device, a camera attitude variation of the second image relative to the initial image comprises:
   repositioning, by the second device, the second image relative to the initial image, to obtain the camera attitude variation.

3. The method according to claim 2, wherein the repositioning, by the second device, the second image relative to the initial image, to obtain the camera attitude variation comprises:
   obtaining, by the second device, an initial feature point of the initial image;
   performing, by the second device, feature point tracking on the second image relative to the initial image, to obtain a target feature point matching the initial feature point;
   calculating, by the second device according to the initial feature point and the target feature point, a homography matrix between the initial image and the second image; and
   decomposing, by the second device, the homography matrix to obtain the camera attitude variation.

4. The method according to claim 2, wherein the obtaining, by the second device, the camera attitude variation through calculation according to the first attitude variation and the second attitude variation comprises:
   obtaining the camera attitude variation comprising the rotation matrix $R_{cf}$ and the displacement vector $T_{cf}$ through calculation according to the following formula, assuming that the first attitude variation comprising a first rotation matrix $R_{mf}$ and a first displacement vector $T_{mf}$, and the second attitude variation comprising a second rotation matrix $R_{cm}$ and a second displacement vector $T_{cm}$:

$$\begin{bmatrix} R_{cf} & T_{cf} \\ 0 & 1 \end{bmatrix} = \begin{bmatrix} R_{cm} & S_{mf} * T_{cm} \\ 0 & 1 \end{bmatrix} * \begin{bmatrix} R_{mf} & T_{mf} \\ 0 & 1 \end{bmatrix},$$

$S_{mf}$ being a scale of the $i^{th}$ anchor image.

5. The method according to claim 1, wherein the obtaining, by the second device, a camera attitude variation of the second image relative to the initial image comprises:
   obtaining, by the second device, a first attitude variation of an $i^{th}$ anchor image relative to the initial image, i>1;
   performing, by the second device, feature point tracking on the second image relative to the $i^{th}$ anchor image, to obtain a second attitude variation; and
   obtaining, by the second device, the camera attitude variation through calculation according to the first attitude variation and the second attitude variation.

6. The method according to claim 1, wherein the second camera attitude parameter comprising the rotation matrix R and the displacement vector T is calculated according to the following formula:

$$\begin{bmatrix} R & T \\ 0 & 1 \end{bmatrix} = \begin{bmatrix} R_{cf} & T_{cf} \\ 0 & 1 \end{bmatrix} * \begin{bmatrix} R_{initial} & T_{initial} \\ 0 & 1 \end{bmatrix},$$

$R_{cf}$ being the rotation matrix in the camera attitude variation, $T_{cf}$ being the displacement vector in the camera attitude variation, $R_{initial}$ being the rotation matrix in the initial attitude parameter, and $T_{initial}$ being the displacement vector in the initial attitude parameter.

7. The method according to claim 1, wherein the receiving, by the second device with the camera, an initial image and an initial attitude parameter that are transmitted by a first device comprises:
   receiving, by the second device, the initial image and the initial attitude parameter that are transmitted by the first device through a target data channel, the target data channel comprising at least one of a wireless fidelity (WiFi) network, Bluetooth, a wired network, and a data line.

8. The method according to claim 1, wherein the receiving, by the second device with the camera, an initial image and an initial attitude parameter that are transmitted by a first device comprises:
   receiving, by the second device, the initial image and the initial attitude parameter that are transmitted by a server, the initial image and the initial attitude parameter being transmitted to the server by the first device.

9. An electronic device, comprising a memory and a processor, the memory storing computer-readable instructions, the computer-readable instructions, when executed by the processor, causing the processor to perform:
receiving an initial image and an initial attitude parameter that are transmitted by a first device;
obtaining a second image acquired by a camera;
obtaining a camera attitude variation of the second image relative to the initial image;
obtaining according to the initial attitude parameter and the camera attitude variation, a current camera attitude parameter corresponding to the second image, comprising:
calculating a rotation matrix in the current camera attitude parameter and a displacement vector in the current camera attitude parameter according to: a rotation matrix in the camera attitude variation, a displacement vector in the camera attitude variation, a rotation matrix in the initial attitude parameter, and a displacement vector in the initial attitude parameter; and
displaying an AR scene according to the current camera attitude parameter, the AR scene of the electronic device being consistent with an AR scene displayed on the first device corresponding to the initial image.

10. The electronic device according to claim 9, wherein the obtaining a camera attitude variation of the second image relative to the initial image comprises:
repositioning the second image relative to the initial image, to obtain the camera attitude variation.

11. The electronic device according to claim 10, wherein the repositioning the second image relative to the initial image, to obtain the camera attitude variation comprises:
obtaining an initial feature point of the initial image;
performing feature point tracking on the second image relative to the initial image, to obtain a target feature point matching the initial feature point;
calculating, according to the initial feature point and the target feature point, a homography matrix between the initial image and the second image; and
decomposing the homography matrix to obtain the camera attitude variation.

12. The electronic device according to claim 10, wherein the obtaining the camera attitude variation through calculation according to the first attitude variation and the second attitude variation comprises:
obtaining the camera attitude variation comprising the rotation matrix $R_{cf}$ and the displacement vector $T_{cf}$ through calculation according to the following formula, assuming that the first attitude variation comprises a first rotation matrix $R_{mf}$ and a first displacement vector $T_{mf}$, and the second attitude variation comprises a second rotation matrix $R_{cm}$ and a second displacement vector $T_{cm}$:

$$\begin{bmatrix} R_{cf} & T_{cf} \\ 0 & 1 \end{bmatrix} = \begin{bmatrix} R_{cm} & S_{mf} * T_{cm} \\ 0 & 1 \end{bmatrix} * \begin{bmatrix} R_{mf} & T_{mf} \\ 0 & 1 \end{bmatrix},$$

$S_{mf}$ being a scale of the $i^{th}$ anchor image.

13. The electronic device according to claim 9, wherein the obtaining a camera attitude variation of the second image relative to the initial image comprises:
obtaining a first attitude variation of an $i^{th}$ anchor image relative to the initial image, i>1;
performing feature point tracking on the second image relative to the $i^{th}$ anchor image, to obtain a second attitude variation; and
obtaining the camera attitude variation through calculation according to the first attitude variation and the second attitude variation.

14. The electronic device according to claim 9, wherein the current camera attitude parameter comprising the rotation matrix R and the displacement vector T is calculated according to the following formula:

$$\begin{bmatrix} R & T \\ 0 & 1 \end{bmatrix} = \begin{bmatrix} R_{cf} & T_{cf} \\ 0 & 1 \end{bmatrix} * \begin{bmatrix} R_{initial} & T_{initial} \\ 0 & 1 \end{bmatrix},$$

$R_{cf}$ being the rotation matrix in the camera attitude variation, $T_{cf}$ being the displacement vector in the camera attitude variation, $R_{initial}$ being the rotation matrix in the initial attitude parameter, and $T_{initial}$ being the displacement vector in the initial attitude parameter.

15. The electronic device according to claim 9, wherein the receiving an initial image and an initial attitude parameter that are transmitted by a first device comprises:
receiving the initial image and the initial attitude parameter that are transmitted by the first device through a target data channel, the target data channel comprising at least one of a wireless fidelity (WiFi) network, Bluetooth, a wired network, and a data line.

16. The electronic device according to claim 9, wherein the receiving an initial image and an initial attitude parameter that are transmitted by a first device comprises:
receiving the initial image and the initial attitude parameter that are transmitted by a server, the initial image and the initial attitude parameter being transmitted to the server by the first device.

17. One or more non-transitory storage media storing computer-readable instructions, the computer-readable instructions, when executed by one or more processors, causing the one or more processors of a second device to perform:
receiving an initial image and an initial attitude parameter that are transmitted by a first device;
obtaining a second image acquired by a camera;
obtaining a camera attitude variation of the second image relative to the initial image;
obtaining according to the initial attitude parameter and the camera attitude variation, a current camera attitude parameter corresponding to the second image, comprising:
calculating a rotation matrix in the current camera attitude parameter and a displacement vector in the current camera attitude parameter according to: a rotation matrix in the camera attitude variation, a displacement vector in the camera attitude variation, a rotation matrix in the initial attitude parameter, and a displacement vector in the initial attitude parameter; and
displaying an AR scene according to the second camera attitude parameter, the AR scene of the second device being consistent with an AR scene displayed on the first device corresponding to the initial image.

18. The storage media according to claim 17, wherein the obtaining a camera attitude variation of the second image relative to the initial image comprises:
repositioning the second image relative to the initial image, to obtain the camera attitude variation.

19. The storage media according to claim 18, wherein the repositioning the second image relative to the initial image, to obtain the camera attitude variation comprises:

obtaining an initial feature point of the initial image;

performing feature point tracking on the second image relative to the initial image, to obtain a target feature point matching the initial feature point;

calculating, according to the initial feature point and the target feature point, a homography matrix between the initial image and the second image; and decomposing the homography matrix to obtain the camera attitude variation.

20. The storage media according to claim 17, wherein the obtaining a camera attitude variation of the second image relative to the initial image comprises:

obtaining a first attitude variation of an $i^{th}$ anchor image relative to the initial image, i>1; performing feature point tracking on the second image relative to the $i^{th}$ anchor image, to obtain a second attitude variation; and obtaining the camera attitude variation through calculation according to the first attitude variation and the second attitude variation.

* * * * *